US010577172B2

(12) United States Patent
Perentes et al.

(10) Patent No.: US 10,577,172 B2
(45) Date of Patent: Mar. 3, 2020

(54) PACK FOR PREPARING INFUSION BEVERAGES

(71) Applicant: NESTEC S.A., Vevey (CH)

(72) Inventors: Alexandre Perentes, Lausanne (CH); Youcef Ait Bouziad, Echandens (CH); Damien Neurohr, Sion (CH)

(73) Assignee: Societe des Produits Nestle S.A., Vevey (CH)

( * ) Notice: Subject to any disclaimer, the term of this patent is extended or adjusted under 35 U.S.C. 154(b) by 363 days.

(21) Appl. No.: 15/503,807

(22) PCT Filed: Jul. 23, 2015

(86) PCT No.: PCT/EP2015/066835
§ 371 (c)(1),
(2) Date: Feb. 14, 2017

(87) PCT Pub. No.: WO2016/023725
PCT Pub. Date: Feb. 18, 2016

(65) Prior Publication Data
US 2017/0275089 A1    Sep. 28, 2017

(30) Foreign Application Priority Data

Aug. 14, 2014  (EP) .................................... 14180921

(51) Int. Cl.
*B65D 85/80* (2006.01)
*A47J 31/00* (2006.01)
(Continued)

(52) U.S. Cl.
CPC ........ *B65D 85/8043* (2013.01); *A47J 31/407* (2013.01); *A47J 31/4492* (2013.01);
(Continued)

(58) Field of Classification Search
CPC ............... B65D 85/8043; B65D 85/804; A47J 31/3695; A47J 31/3676; A47J 31/3666; A47J 31/4492
(Continued)

(56) References Cited

U.S. PATENT DOCUMENTS 3,372,634 A * 3/1968 Brinkman ............. A47J 31/043
426/112
4,818,544 A * 4/1989 Seward ............. B65D 85/8043
426/77
(Continued)

FOREIGN PATENT DOCUMENTS

| CN | 106660677 A | 5/2017 |
|---|---|---|
| EP | 0179641 | 4/1986 |

(Continued)

*Primary Examiner* — Reginald Alexander
(74) *Attorney, Agent, or Firm* — K&L Gates LLP

(57) ABSTRACT

Pack (100) having an inner volume in which a beverage medium is stored and from which an infusion beverage is prepared when a fluid is introduced inside the pack (100), said inner volume being defined by sheets of material joined to one another at their edges, such that the inner volume presents a generally plane shape, said pack (100) comprising an inlet chamber (120) configured to accommodate an inflow of fluid that will infuse the beverage medium to produce an infusion beverage and at least one outlet duct (12) for delivering the infusion beverage from said inner volume, said inlet chamber (120) and said outlet duct (12) being positioned at the bottom of the pack (100), the pack (100) further comprising a compartmental channel (250) and a filtering element (30) configured in such a way that they define a dedicated chamber inside the volume of the pack where the beverage medium is confined, the filtering element (30) being further configured for preventing the particles of the beverage medium from entering the outlet duct (12) when fluid is introduced in the pack and the infusion
(Continued)

beverage is prepared, thus preventing these particles from being delivered together with the infusion beverage.

18 Claims, 5 Drawing Sheets

(51) Int. Cl.
- *B65D 85/804* (2006.01)
- *B65D 75/58* (2006.01)
- *A47J 31/40* (2006.01)
- *A47J 31/44* (2006.01)
- *B65D 65/40* (2006.01)
- *B65D 75/20* (2006.01)
- *B65D 75/30* (2006.01)
- *A47J 31/36* (2006.01)

(52) U.S. Cl.
CPC ............. *B65D 65/40* (2013.01); *B65D 75/20* (2013.01); *B65D 75/30* (2013.01); *B65D 75/5883* (2013.01); *A47J 31/3695* (2013.01); *B65D 85/804* (2013.01)

(58) Field of Classification Search
USPC .............................. 99/323, 295; 426/77, 115
See application file for complete search history.

(56) References Cited

U.S. PATENT DOCUMENTS

| | | | |
|---|---|---|---|
| 6,347,725 B1 | 2/2002 | Yoakim et al. | |
| 9,663,288 B2* | 5/2017 | Mariner | B65D 85/8043 |
| 2002/0078831 A1* | 6/2002 | Cai | A47J 31/14 |
| | | | 99/295 |
| 2003/0159589 A1* | 8/2003 | Meador | A47J 31/005 |
| | | | 99/295 |
| 2005/0150391 A1* | 7/2005 | Schifferle | A47J 31/0673 |
| | | | 99/295 |
| 2014/0220192 A1* | 8/2014 | Deeb | A47J 31/407 |
| | | | 426/115 |
| 2016/0347525 A1* | 12/2016 | Butscher | A47J 31/0657 |

FOREIGN PATENT DOCUMENTS

| | | |
|---|---|---|
| GB | 2406305 | 3/2005 |
| WO | 9905044 A1 | 2/1999 |
| WO | 2011024103 | 3/2011 |
| WO | 2011054402 A1 | 5/2011 |
| WO | 2012175985 | 12/2012 |

\* cited by examiner

— 1 —

PACK FOR PREPARING INFUSION BEVERAGES

CROSS REFERENCE TO RELATED APPLICATIONS

The present application is a National Stage of International Application No. PCT/EP2015/066835, filed on Jul. 23, 2015, which claims priority to European Patent Application No. 14180921.0, filed Aug. 14, 2014, the entire contents of which are being incorporated herein by reference.

FIELD OF THE INVENTION

The present invention relates to a pack for preparing infusion beverages; in particular it refers to a disposable pack for preparing infusion beverages, most preferably tea, by means of a fitment assembly comprised in the disposable pack. The invention also refers to a machine for preparing infusion beverages from such a disposable pack.

BACKGROUND OF THE INVENTION

Devices for preparing infusions, typically tea makers are known devices in the state of the art where tea leaves are typically introduced in a first compartment comprising a filter such that when water is passed through this first compartment, the filtered fluid obtained is conveyed into a second compartment, from where tea is poured from a dedicated outlet. However, these devices have to be cleaned after each use and are not disposable or suitable for one-use only.

Tea bags made of a porous filter paper, silk or food grade plastic, sealed together to conform a bag comprising inside its volume tea leaves, herbal leaves or spices are also common in the state of the art, and perform the function of tea infusers. When these tea bags are introduced in hot water and are kept inside for a certain period of time, depending on the infusion characteristics, the tea beverage is brewed. These tea bags are disposable but are not so convenient for the consumer, who needs to invest quite some time to prepare the beverage and also needs to squeeze the tea bag before putting it away, resulting in a process which is both cumbersome and time consuming.

Using capsules comprising tea or herbal leaves inside through which water would be injected to brew the beverage also presents several disadvantages, such as the time needed to prepare a beverage, for example, the cost of the capsules and the packaging space needed to arrange and keep these capsules.

Therefore, it would be desirable to provide a disposable flexible pack from which infusion beverages can be produced in a reduced time, where recipes and infusion parameters are automatically adapted such that the beverage preparation is optimized. Moreover, the pack needs to be easy to use, clean and requiring the least of input operations from the side of the consumer.

The present invention comes to provide a solution to the above-described needs, as it will be further explained. The invention also aims at other objects and particularly at the solution of other problems as will appear in the rest of the present description.

SUMMARY OF THE INVENTION

According to a first aspect, the invention refers to a pack 100 having an inner volume in which a beverage medium is stored and from which an infusion beverage is prepared when a fluid is introduced inside the pack 100, said inner volume being defined by sheets of material joined to one another at their edges, such that the inner volume presents a generally plane shape. The pack 100 comprises an inlet chamber 120 configured to accommodate an inflow of fluid that will infuse the beverage medium to produce an infusion beverage and at least one outlet duct 12 for delivering the infusion beverage from said inner volume, said inlet chamber 120 and said outlet duct 12 being positioned at the bottom of the pack 100. The pack 100 further comprises a compartmental channel 250 and a filtering element 30 configured in such a way that they define a dedicated chamber inside the volume of the pack where the beverage medium is confined, the filtering element 30 being further configured for preventing the particles of the beverage medium from entering the outlet duct 12 when fluid is introduced in the pack and the infusion beverage is prepared, thus preventing these particles from being delivered together with the infusion beverage.

The inner volume defined by the sheets of material in the pack 100 of the invention preferably presents a generally plane shape defining a plane essentially vertically oriented during beverage production, the inlet chamber 120 being oriented essentially perpendicularly to the plane defined by the inner volume, the outlet duct 12 being arranged essentially vertically from the inner volume enabling a free flow of the infusion beverage prepared from the pack 100.

Preferably, the inlet chamber 120 and the outlet duct 12 are comprised in a fitment assembly 10, the fitment assembly 10 being arranged at the bottom of the pack 100 and being at least partially positioned between two joined edges of the sheets of material.

Preferably, the inlet chamber 120 is reversibly configured in the pack such that a first piercable lid is laid over one of the sides of the inlet chamber 120 and a second piercable lid is laid over the reverse side of the inlet chamber 120.

The fitment assembly 10 typically comprises two symmetrically arranged inlet notches 110, 110' allowing the fluid to flow out of the inner volume of the inlet chamber 120.

The fitment assembly 10 is typically made of a rigid plastic material, preferably made by injection moulding, the material being preferably selected from: polypropylene, polyethylene, polyethylene terephthalate and/or polylactic acid.

The outlet duct 12 is preferably closed by means of a plug 14, the plug 14 being attached to the fitment assembly 10 on another one of its sides, the outlet duct 12 further comprising a weakened area 16 near the plug 14 allowing the separation of the plug 14 from the outlet duct 12.

Typically, the inner volume of the pack is defined by two flexible sheets of material bonded together at least on their lateral sides, these flexible sheets also conforming at least one piercable lid over the inlet chamber 120.

The inner volume of the pack is configured by one single flexible sheet folded in half into two parts joined at its free edges, according to a preferred embodiment of the invention.

The sheets of material configuring the inner volume of the pack are water impermeable, are bonded together by thermo sealing and are made of a material being one or a combination of the following: plastic laminates, metallised foil or alufoil or fibre base material.

The filtering element 30 is typically arranged transversely in the inner volume of the pack 100 fixed to the lateral edges of the sheets of material configuring said inner volume. The filtering element 30 preferably comprises a primary part 30a for a primary filtering of the infused beverage separating the fluid from the beverage medium and a secondary part 30b for a further filtering of the infused fluid.

The pack 100 of the invention preferably comprises identification means 60 comprising the information on the process parameters to prepare the infusion beverage, as a function of the beverage medium, the process parameters being at least one or a combination of the following: temperature of the fluid accommodated into the inlet chamber 120, total volume of fluid and fluid flow accommodated inside the inlet chamber 120.

Typically, two sets of symmetrically arranged identification means 60 are arranged in the pack, so that the process parameters in the identification means 60 can be reversibly read.

The identification means 60 preferably comprise recognition means being at least one or a combination of the following ones: mechanical codes, optical codes, RFID tags, bar codes, magnetic codes, embossing codes or LED, the recognition means preferably comprising a plurality of punched holes 61 arranged on the lateral edges of the pack 100.

According to a second aspect, the invention refers to a machine 200 for preparing an infusion beverage from a pack 100 as described previously. The machine 200 typically comprises receiving means 201 adapted to accommodate the pack 100 with the inlet chamber 120 and the outlet duct 12 being positioned at the bottom of the pack 100, the machine 200 further comprising injecting means 230 designed for accommodating fluid inside the volume of the inlet chamber 120.

Preferably, the injecting means 230 comprise a fluid needle designed for accommodating fluid inside the volume of the inlet chamber 120 at a pressure below around 1 bar, preferably around 0.5 bar.

Typically, the machine 200 further comprises a data reader configured to read and retrieve the information of the process parameters from the identification means 60 in the pack 100, the data reader preferably comprising a light emitter device.

BRIEF DESCRIPTION OF THE DRAWINGS

Further features, advantages and objects of the present invention will become apparent for a skilled person when reading the following detailed description of non-limiting embodiments of the present invention, when taken in conjunction with the appended drawings, in which.

DETAILED DESCRIPTION OF EXEMPLARY EMBODIMENTS

Figure 1:
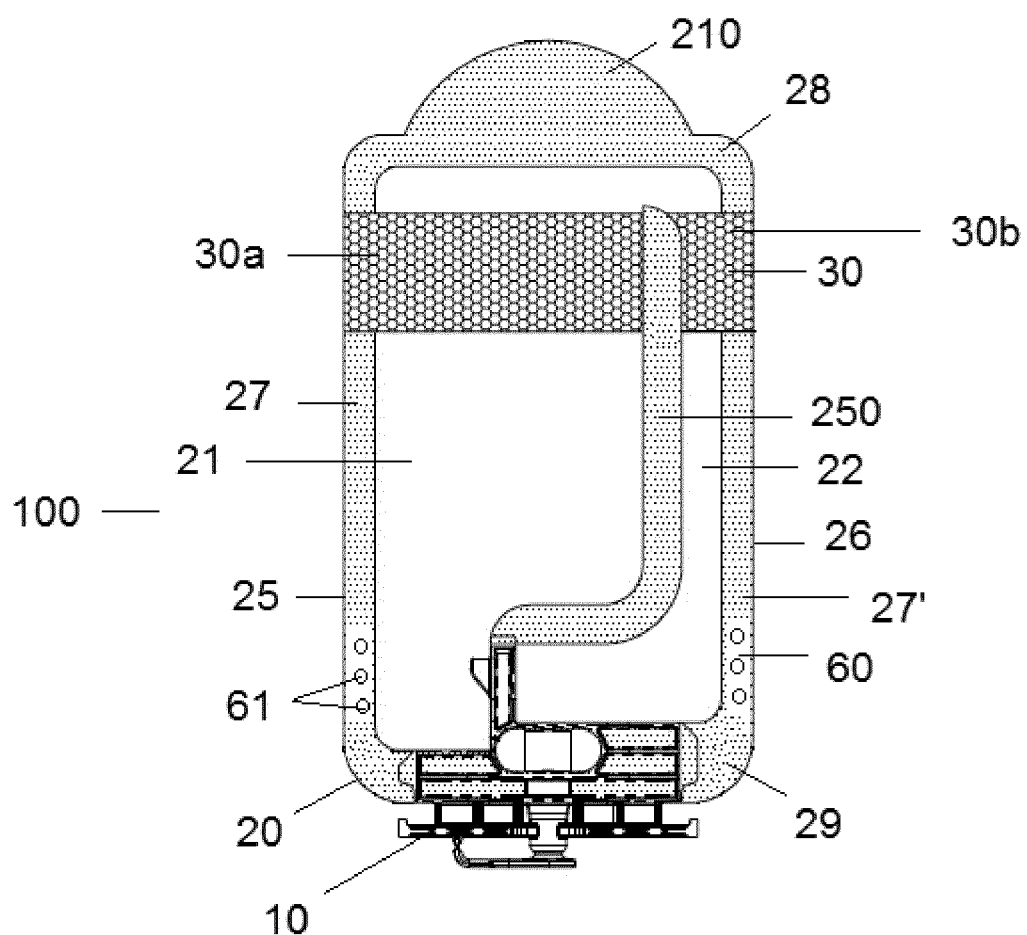
FIG. 1 shows a frontal schematic view of a pack for preparing infusion beverages according to the present invention, comprising a fitment assembly, a filtering element and a container.

The present invention relates to a pack 100 for preparing an infusion beverage, in particular the invention relates to a pack 100 for preparing an infusion beverage by means of a flow of hot water flowing through a beverage medium, typically through tea leaves. The pack 100 of the invention is typically disposable and comprises a fitment assembly 10, a filtering element 30 and a container 20.

The container 20 is preferably flexible, configured as a pouch or sachet, and is typically made of two flexible sheets bonded together, preferably by welding or by heat sealing (thermo sealing), on the lateral sides 27 and 27', on the upper side 28 and on the lower side 29. The fitment assembly 10 is preferably arranged at the lower side 29 of the container 20 such that the flexible sheets cover at least partially the frontal and/or the rear side of the fitment assembly 10.

The fitment assembly 10 has two functions within the pack 100 according to the invention: it works as inlet for the fluid (typically water) coming into the pack 100 for being infused with the beverage medium which is also comprised inside the volume of the pack 100 and it also works as outlet for the infusion beverage prepared in the pack 100.

The fitment assembly 10 is preferably arranged in the lower side 29 of the pack 100, as schematically shown in FIG. 1. The fitment assembly 10 comprises an outlet duct 12, preferably arranged vertically and parallel to the lateral sides 27 and 27' of the pack 100 in order to allow the dispensing of the infusion beverage by free flow: during preparation and dispensing phases, the pack 100 is preferably arranged vertically, such that the fitment assembly 10 is arranged at the lower side 29 of the container 20, i.e., at the lower side 29 of the pack 100.

The container 20 is preferably flexible and is made of two flexible water impermeable sheets 25, 26 joined to one another to define an inner volume which is compartmented, as will be explained further in more detail. Typically, the container 20 presents an essentially plane shape being substantially flexible so that it looks like a pouch or sachet. By flexible, it is meant that the sheets 25, 26 can be bent easily. The resulting pack 100 can be bent also, as being soft and can be deformed contrary to rigid containers. The flexible sheet material for the sheets 25, 26 can be plastic laminates, metallised foil or alufoil or fibre base material. According to the invention, the container 20 can be formed of two separate flexible water impermeable sheets 25, 26 joined together or it can be formed of one single flexible water impermeable sheet folded in half into two parts or sheets 25, 26 and joined at its free edges to define the inner volume of the container 20.

According to a preferred embodiment, the container 20 is formed of one single flexible water impermeable sheet folded in half into two parts of flexible sheets which will be referred to as 25, 26, and joined at its free edges, such that the container 20 is configured as a plane pouch made of a flexible material sheet, said sheet being folded at the top of the container 20 (therefore, the upper side 28 will have no welding or heat sealing (thermo sealing) and will be made by the simple bending of the flexible sheet on top) and bonded on its edges (therefore, forming the lateral sides, 27 and 27') to define the inner volume, the bottom bonded edge (lower side 29) typically including the fitment assembly 10. This embodiment constitutes a particularly easy way to manufacture the pack 100 since it requires the cutting of only one piece of sheet—most preferably according to a rectangular shape—and its folding to create the inner volume of the container 20. Typically, also for manufacturing convenience, the fitment assembly 10 is introduced in the lower side 29 of the container 20 during the sealing of its edges, typically by welding or heat sealing.

As shown in FIG. 1, the sheets 25, 26 configuring the two sides of the container 20 are further sealed together in a specific area in the inside of the container 20: the sheets 25 and 26 are preferably welded or heat sealed together, to form a compartmental channel 250 under a specific shape, as shown in FIG. 1, such that internal different compartments are formed, as it will be further explained. Typically, the filtering element 30 is arranged first transversely in the sheets of material configuring the container 20, then it is fixed at the lateral sides 27 and 27' and, at a later stage, the configuration of the compartmental channel 250 is done, on top of the filtering element 30 already arranged, by sealing together the sheets 25 and 26.

The compartmental channel 250 delimits together with one of the lateral sides 27, with the upper side 28 and with part of the lower side 29 of the container 20, together with the fitment assembly 10, an inner volume defining a primary chamber 21, as illustrated in FIG. 1. The primary part 30a of the filtering element 30 is arranged in the primary chamber 21, as shown in this Figure. The beverage medium, typically tea leaves, are confined in the primary chamber 21, in fact are confined in the volume of the primary chamber 21 also delimited by the primary part 30a of the filtering element 30. The fluid, typically water, flows upwards into the primary chamber 21, infuses with the tea leaves confined inside and then is filtered by passing through the primary part 30a of the filtering element 30: therefore, the fluid is filtered by passing through this primary part 30a such that the beverage medium is kept in the primary chamber 21 and the filtered infused fluid is conveyed to another chamber of the container 20. The compartmental channel 250 together with the other lateral side 27' of the container 20, with the upper side 28, with part of the lower side 29 and together with the fitment assembly 10 define an inner volume which configures a secondary chamber 22, as illustrated also in FIG. 1. A secondary part 30b of the filtering element 30 is also arranged at the entrance of this secondary chamber 22: the infused fluid coming from the primary chamber 21 is further filtered by passing through this secondary part 30b and is further flowing downwards by gravity towards the entrance of the outlet duct 12 in the fitment assembly 10, from where the beverage is conveyed to the outside of the pack 100.

Preferably, the filtering element 30 is designed for filtering particles of a size below around 50 microns. The size of the filtering element 30 is preferably comprised in the range from 20 mm$^2$ to 500 mm$^2$, more preferably in the range of 100 mm$^2$ to 200 mm$^2$ and, even more preferably, of around 150 mm$^2$.

As shown in FIG. 1, the filtering element 30 is arranged transversely in the pack 100 fixed to the sheets of the container 20 by the sealing on the lateral sides 27 and 27': this is so by manufacturing convenience, as the sheets configuring the container 20 come typically in a continuous roll and the material out of which the filtering element 30 is going to be made also comes in a continuous form.

Different sizes of the container 20 and therefore of the pack 100 could be used in the same machine adapted to store different quantities of ingredient and allowing different volumes of final infusion beverage obtained: typically, it is the configuration of the fitment assembly 10 as to external shape what determines the machine to use. Therefore, the size of the container 20, when extending vertically, does not determine or limit the machine. So, typically, the size of the container 20 will be adaptable and will be made so by modifying the height of said container 20.

The container 20 can also comprise an excrescence 210 enabling the handling of the pack 100 by the user or consumer, preferably on the upper side of the pack 100, as illustrated in FIG. 1.

Preferably, according to the invention, the pack 100 presents a plane shape oriented along a plane essentially vertically oriented during beverage production in such a way that the water introduced in the fitment assembly 10 flows in an upward direction in the primary chamber 21 infusing the beverage medium for later passing to the secondary chamber 22 where it is conveyed by gravity towards the outlet duct 12 to be dispensed to the outside of the pack 100.

Figure 2:
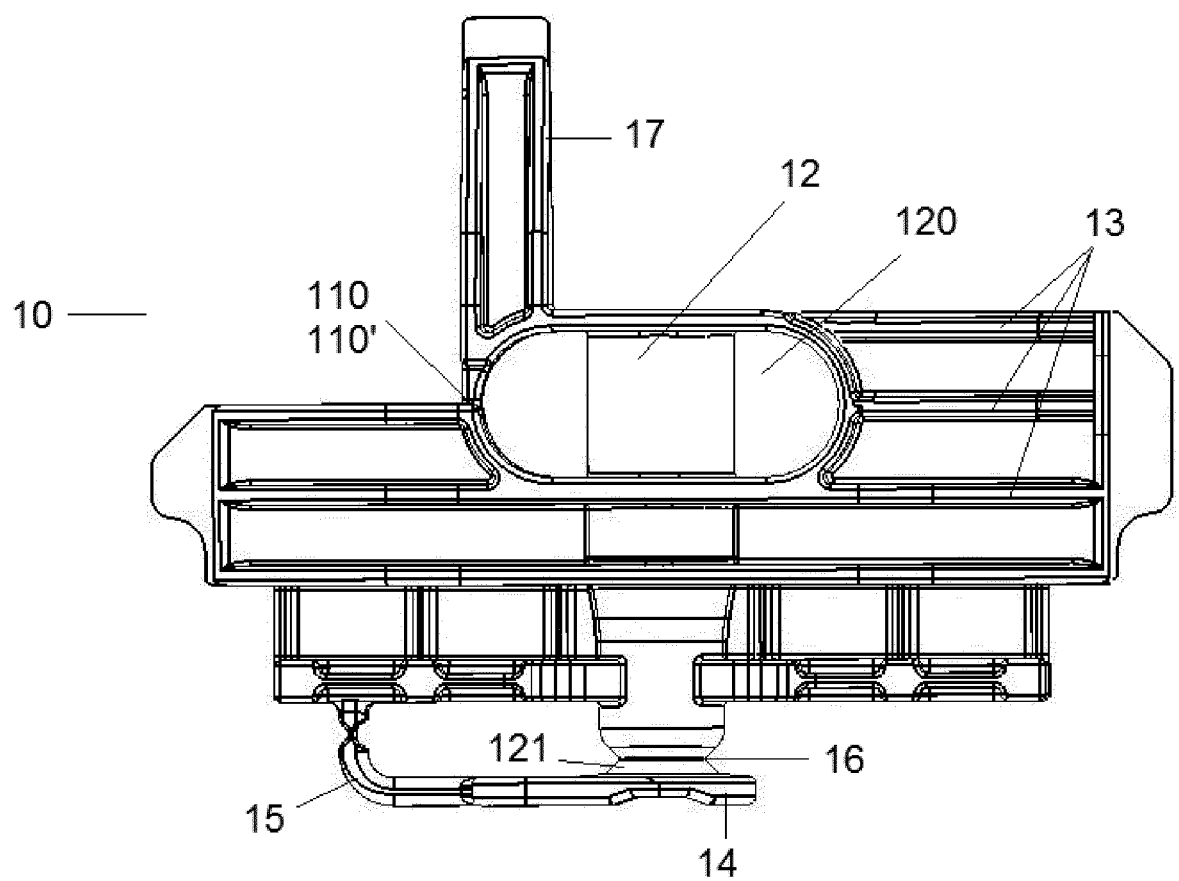
FIG. 2 shows a front detailed view of the fitment assembly of the pack for preparing infusion beverages shown in FIG. 1, according to the present invention.

Preferably, the introduction of the fitment assembly 10 in the bottom edge of the container during the sealing of its edges to configure the complete pack 100 makes it possible that the flexible sheets 25, 26 can cover at least partially the fitment assembly 10. As shown in FIG. 2, for example, the fitment assembly 10 comprises an inlet chamber 120 which is configured by part of the fitment assembly 10 together with part of the flexible sheets 25, 26 when arranged at least partially over the two sides of the fitment assembly 10, as lids or covers. Preferably, in order to make the pack 100 reversible, the inlet chamber 120 can be accessed frontally and also from the rear part. Typically, these lids or covers will be laid over the inlet chamber 120 in a yieldably piercable way such that injecting means 230 arranged in a preparation machine will be able to access the inside volume of the inlet chamber 120 typically by piercing. Moreover, for the inlet chamber 120 to be accessed reversely, a lid will be arranged on the frontal side and another lid will be arranged in the reverse side, i.e. in the rear side. Preferably, these lids will be configured by the flexible sheets 25, 26 themselves but they can also be made out of different parts.

Preferably, the injection means 230 in the machine will be configured as a fluid needle, more preferably as a water needle, having two functions: they can pierce the lid or cover externally laid over the inlet chamber 120 (either frontally or in the rear part depending on the sense of introduction of the pack 100 in the machine, typically configured by the flexible sheets 25, 26 of the container 20) and they can also inject pressurized fluid into the inner volume of said inlet chamber 120.

As previously described, the inlet chamber 120 will be pierced in the part of the flexible sheets 25, 26 which are arranged over the external parts of the fitment assembly 10 making the inlet chamber 120. Consequently during the single step of bonding the edges of the sheet, it is possible to simultaneously create the inner volume of the container 20, to place the fitment assembly 10 and to close the inlet chamber 120. Preferably the outlet duct 12 is not completely covered by the flexible sheets. Yet it can be visually hidden by a part of the sheets 25, 26 e.g. by a skirt of the sheets. Also preferably, according to the invention, the fitment assembly 10 comprises ribs 13 arranged in at least one of the external surfaces of the fitment assembly 10 for improving the adhesion of the fitment assembly 10 with the flexible material sheet during sealing.

Figure 3:
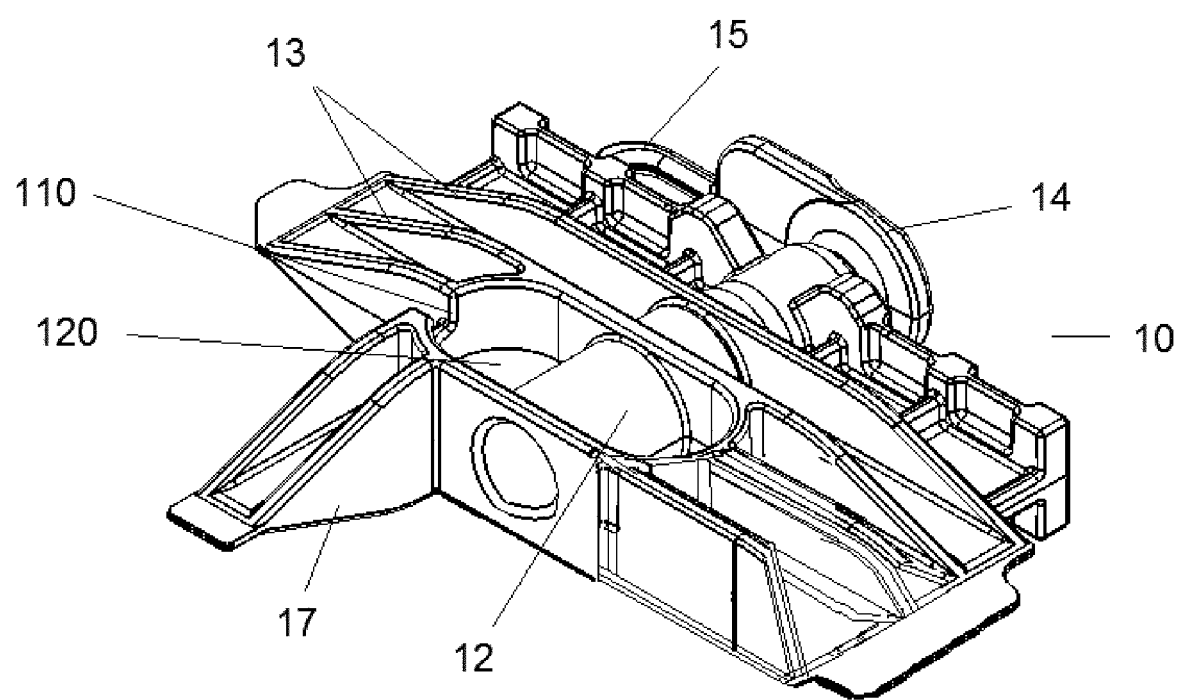
FIG. 3 shows a detailed view of the fitment assembly of the pack for preparing infusion beverages shown in FIG. 1, according to the present invention.

As already described and as it is shown in FIG. 2 or 3, the fitment assembly 10 of the invention comprises an inlet chamber 120 into which fluid is injected by injecting means 230, typically a needle, arranged in a machine into which the pack 100 is inserted for the preparation and dispensing of the infusion beverage. The fitment assembly 10 also comprises an inlet notch 110, preferably two symmetrically arranged inlet notches 110 and 110' (to make the pack 100 be reversible when used in a machine) in the part of the fitment assembly 10 defining the inlet chamber 120: the fluid, typically hot water, injected into the inlet chamber 120 passes towards the primary chamber 21 through these inlet notches 110, 110'.

The fitment assembly 10 of the invention also comprises ribs 13, preferably arranged on both sides of the fitment assembly 10: these ribs 13 are provided on the sides of the fitment assembly 10 to help engage the sheets 25, 26 onto the fitment assembly 10, preferably by welding or heat sealing. Moreover, the fitment assembly 10 comprises an outlet duct 12 through which the infusion beverage is finally dispensed. Preferably the outlet duct 12 is closed by a plug 14, said plug 14 comprising means for maintaining it attached to the fitment assembly 10 after the opening of the outlet duct 12. Consequently the plug 14 does not interfere with the dispensing of the beverage when it is provided through the outlet duct 12, neither does it fall in the beverage during its production. The means for maintaining the plug 14 attached to the fitment assembly 10 can be a plastic bond 15 attached to the fitment assembly 10, for example, or any other suitable means providing a similar effect. Moreover, the outlet duct 12 can also comprise a weakened area 16 near the plug 14: this weakened area 16 can be made for example as a narrowing of the outlet duct 12 so that it is easier to cut or tear off the plug 14 by the machine once the pack 100 is introduced in it for being processed. Typically, the machine where the pack 100 is introduced cuts or tears the plug 14 automatically when the pack 100 is introduced in the machine or when the or when the beverage preparation is activated.

The outlet duct 12 in the fitment assembly 10 of the invention is preferably configured so that it delivers the product as a free flow, meaning that the product can flow from the outlet duct 12 by simple gravity fall. According to a preferred embodiment of the invention, the outlet duct 12 comprises an opening 121 at the bottom of the fitment assembly 10, said opening 121 having a transverse section with a surface area equivalent to the surface of a circular surface of diameter of at least 1 mm, preferably at most 4 mm, even more preferably comprised between 1.5 and 3 mm. The outlet duct 12 is typically configured as a straight tube oriented essentially vertically in the fitment assembly 10, comprising at its end an opening 121. The length of the tube of the outlet duct 12 is preferably of at least 5 mm. An advantage of the outlet duct 12 of the present invention is that there is no need to implement a particular connection between the mentioned outlet and the machine when a beverage is produced in order to direct the flow of the beverage delivered at the outlet duct 12: the beverage can flow from the outlet duct 12 directly into a drinking cup.

According to the invention, before the infusion beverage is prepared, the outlet duct 12 is closed at its end: generally the outlet duct 12 is closed by manufacturing and is configured for being opened at the beverage production step by the machine. By "closed by manufacturing" it is meant that a complete pack 100, comprising the container 20 and the fitment assembly 10, is manufactured with a closed outlet duct 12. This closure guarantees hygienic and shelf life protection. The outlet duct 12 can be opened by the machine preparing the infusion beverage or it can be opened manually by the consumer.

Preferably the plug 14 is part of one single fitment assembly 10: in particular when the spout assembly 10 is made by injection moulding, the design of the mould also comprises that of the plug 14. In the same manner the plastic bond 15 can also be part of the design of the fitment assembly 10 when it is made by injection moulding, which again provides advantages from a manufacturing point of view, as the same part comprises the plug 14 and the bond 15.

The fitment assembly 10 also comprises, as depicted in FIG. 2, a sealing wall 17 which is arranged vertically on the upper part of the fitment assembly 10: the flexible sheets 25, 26 of the container 20 are welded or heat sealed to this sealing wall 17 in order to configure one of the sides of the primary chamber 21 and also another side of the secondary chamber 22.

The fitment assembly 10 is preferably rigid and is made of a rigid plastic material, preferably by injection moulding. Typically, this plastic material configuring the fitment assembly 10 can be selected from the following: polypropylene, polyethylene, polyethylene terephthalate and polylactic acid. Also according to a less preferred embodiment the fitment assembly 10 can be made of a metal like aluminium or tin-plate, for example.

According to the invention, the pack 100 will also be provided with identification means 60: these identification means 60 comprise the information of the type of beverage medium comprised in the pack 100 and also the information for the optimum processing of this beverage medium in a machine where the beverage will be prepared (therefore, comprising the recipe information for the preparation of the infusion beverage). The identification means 60 will be arranged either in the fitment assembly 10 and/or in the container 20. A simpler execution will be to provide these identification means 60 in the pack 20, preferably in the lateral sides 27, 27' where the flexible sheets 25 and 26 are welded or heat sealed together and where there is no product (beverage medium) that would avoid the arrangement of these means. The identification means 60 comprise the information provided to the machine regarding the process parameters to be followed to produce the infusion beverage, in particular: temperature of water introduced by the injecting means 230 in the inlet chamber 120, total volume of water introduced and water flow to be provided through the mentioned injecting means 230. Further explanation will be provided in the description that follows.

One of the primary advantages of the present invention is that the pack 100 is reversible, so the user can introduce it in one sense or the other in the machine, and the process will develop in the same way independently on the sense of introduction. For this reason, when the identification means 60 are provided in the pack 100, two sets of identification means 60 will preferably be provided, symmetrically arranged, on both lateral sides, 27 and 27', of the container 20 as shown in FIG. 1: in this way, the machine can read one or the other set of identification means 60, depending on the sense in which the pack 100 has been introduced in the machine.

Such identification means 60 can comprise any kind of recognition means such as, for example, mechanical codes, optical codes, RFID tags, bar codes, magnetic codes, embossing codes, LED or any other. Most preferably, the identification means 60 of the invention will be made as punched holes 61 (schematically represented in FIG. 1) arranged on the sealed lateral edges 27, 27' of the container 20. When the two sheets 25 and 26 are brought together and are welded or heat sealed on the edges to configure the container 20, additional punching will be provided, thus configuring the punched holes 61. A plurality of holes will typically be provided vertically on each one of the lateral sides 27 and 27' of the container 20 to configure the two sets of identification means 60 symmetrically arranged in the container 20: these holes will be made transparent for light, allowing the light to pass through. When light passes through the plurality of holes configuring these identification means 60, the machine will be then provided with information on the process parameters to follow in order to prepare the infusion beverage targeted.

As shown in FIG. 1, the filtering element 30 in the pack 100 of the invention is arranged transversely between the two lateral sides of the container, partly arranged in the primary chamber 21 (primary part 30*a*) and partly arranged in the secondary chamber 22 (secondary part 30*b*): in this way, the water infusing the beverage medium in the primary chamber 21 necessarily needs to pass through the primary part 30*a* of the filtering element 30 in order to access the secondary chamber 22; even more, this filtered fluid will have to be filtered a second time in the secondary part 30*b* before accessing the outlet duct 12, meaning that no product can be dispensed when it has not been properly and sufficiently filtered.

The filtering element 30 will be configured according to the main parameters defining its characteristics, namely: wet strength, porosity, particle retention, flow rate, compatibility, efficiency and capacity, amongst others, and will be made of a suitable material allowing proper filtering (for example paper, plastic mesh or any other).

Figure 6:
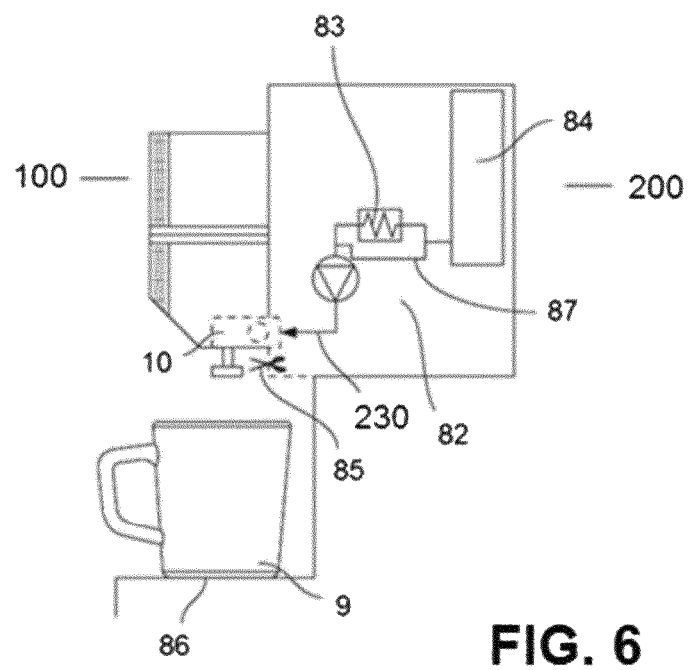
FIG. 6 shows the interaction of a pack for preparing infusion beverages according to the present invention with a beverage preparation machine.

According to yet another aspect, the invention refers to a machine 200 for preparing an infusion beverage from a pack 100 as described previously. The machine 200, as schematically illustrated in FIG. 6, comprises receiving means 201 adapted to accommodate the pack 100 preferably in such a way that the pack 100 is positioned vertically and the fitment assembly 10 is positioned at the bottom of the pack 100. The machine 200 further comprises injecting means 230, preferably piercing and injecting means, designed for piercing the cover or lid over the inlet chamber 120 for introducing water into the mentioned inlet chamber 120. Because the pack 100 is preferably configured reversible, either if the pack 100 is introduced in one sense or the other in the machine 200, the piercing and injecting 230 means will pierce either one or the other side of the lid or cover over the inlet chamber 120, with same result as water will in any case be conveyed into the inlet chamber 20 and from there, through the symmetrically arranged inlet notches 110, 110', into the primary chamber 21.

Preferably, the injecting means 230 comprise a fluid needle, called simply needle, comprising an inner duct or pipe through which fluid, typically water, is introduced in the inlet chamber 120. Water is injected at a pressure of typically less than 1 bar, more preferably at about 0.5 bar to infuse the beverage medium, typically tea leaves. As the pressure is low, there is no problem of tightness with the pack 100 and machine 200 of the invention. The water is introduced by the injecting means 230 in a continuous way during a certain time and under a certain flow rate and until a total volume of water is achieved, which is provided by the identification means 60 in the pack 100. The process with the pack 100 is done in a continuous way and is faster than standard processes (usually, it takes around 1 minute to have the beverage ready). The water injected by the piercing and injecting means 230 is preferably hot, and is preferably provided at a temperature comprised between 60° C. and 95° C.

The injecting means 230 can also comprise a toroidal ring, preferably made of rubber, ensuring that there is no leakage of fluid outside the inlet chamber 120 while the injecting means 230 are introduced and are injecting water into the inlet chamber 120.

The machine 200 also comprises a data reader, preferably comprising an optical device, which reads and retrieves the information from the identification means 60 regarding the process parameters to be used for preparing the infusion beverage. Preferably, the process parameters used by the machine 200 to prepare the correct recipe for the beverage medium comprised in the pack 100, retrieved by the data reader, would be at least one or a combination of the following: temperature of water introduced by the injecting means 230 in the inlet chamber 120; total volume of water introduced in the inlet chamber 120; and water flow provided through the injecting means 230 also into the inlet chamber 120.

Preferably, the data reader will retrieve the information from the identification means 60 in the pack 100 by a light emitter device emitting light passing through the punched holes 61 configuring the identification means 60.

Figure 4:
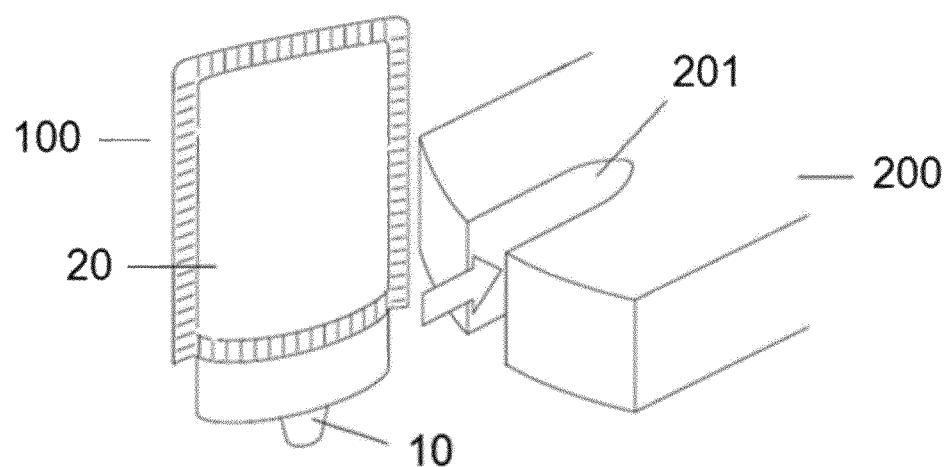
FIG. 4 shows an illustration of a possible embodiment of a machine designed for slidably receiving a pack for preparing infusion beverages according to the present invention.
Figure 5:
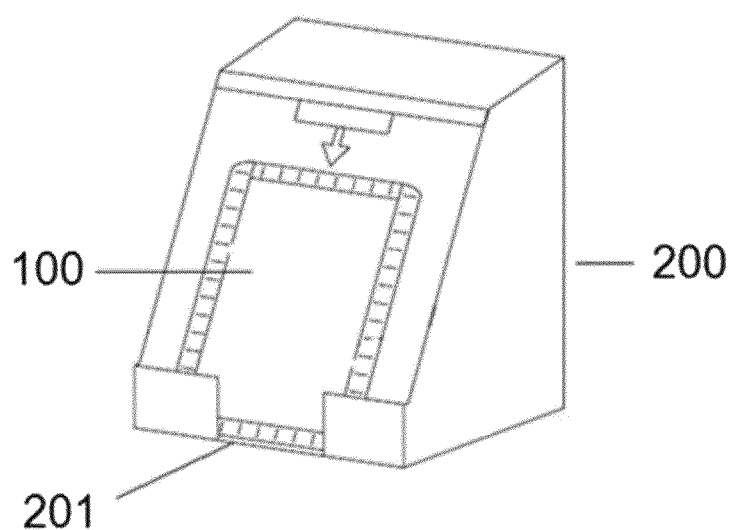
FIG. 5 shows an illustration of another possible embodiment of a machine designed for receiving frontally a pack for preparing infusion beverages according to the present invention.

Typically, as the pack 100 is processed to obtain the infusion beverage in an essentially vertical position in the machine 200, the pack 100 will be introduced either frontally in the machine 200 (as schematically represented in FIG. 5) or laterally, so that the pack 100 is slidably inserted into a dedicated insert in the machine 100 (as schematically represented in FIG. 4). In the first case, that of FIG. 5, the receiving means 201 in the machine 200 will be arranged to accommodate the pack 100 in a frontal position: as the pack 100 is reversible, it can be introduced either in a frontal positioning in the dedicated receiving means 201, or in a rear positioning in said receiving means 201. In the second case, that of FIG. 4, the receiving means 201 in the machine 200 will be arranged to accommodate the pack 100 in a lateral or side position: as the pack 100 is reversible, it can be introduced in any of the two possible lateral senses into the dedicated receiving means 201. In any of the two cases described, the injecting means 230 will be able to pierce and inject water in one of the two sides of the inlet chamber 120, and the data reader will also be able to read the information in one of the two sets of identification means 60 provided in the container 20.

Moreover, the machine 200 of the invention comprises a fluid supply or tank 84 and a pump 82, preferably a water pump, providing water to the injecting means 230. This water is preferably provided at a certain temperature, preferably comprised between 60° C. and 95° C., with the aid of a heater 83. The machine can optionally also comprise a bypass line 87 for delivering fluid, typically water, at ambient temperature, and a valve (not illustrated) for the selection of either hot or ambient fluid. The machine 200 will also typically comprise a cutting device 85 for cutting or tearing the plug 14 from the outlet duct 12 once the pack 100 has been inserted in the machine 200 or once the infusion process has started.

The cutting device 85 for cutting or tearing the plug 14 is preferably arranged in the machine 200 in such a way that the plug is automatically cut when the pack 100 is introduced in the machine 200 or when the beverage preparation is activated.

Preferably the machine 200 further comprises a positioning area 86 for allocating a drinking cup 9 under the dispensing outlet duct 12 of the pack 100 when a beverage is prepared.

Also, the machine 200 typically comprises squeezing means (not illustrated in FIG. 6) which squeeze the container 20 once the infusion beverage has been dispensed in order to extract any remaining liquid inside the container 20, so as to avoid dripping. Moreover, the squeezing of the container 20 will allow that the end pack 100, which is disposable, will have a final more compact shape that will facilitate its removal.

Also according to the invention, a pack 100 as the one described above comprising a fitment assembly 10, a filtering element 30 and a container 20, would preferably be made following these steps:
  folding a sheet of material, introducing transversely a filtering element 30 and bonding both lateral sides 27 and 27' of it to form a pouch;
  bonding together by welding or heat sealing the two sheets 25 and 26 to conform the compartmental channel 250;
  filling the primary chamber 21 configured inside the volume of the pack 100 with a beverage medium, typically with tea leaves;
  positioning the fitment assembly 10 in the lower part of the pouch, where remaining open edges exist and bonding (by welding or heat sealing) said lower side 29;
  configuring the identification means 60 preferably by punching the lateral sides 27 and 27' of the pouch or container 20.

The method of using a pack 100 configured as previously described, comprising a fitment assembly 10, a filtering element 30 and a container 20, in a machine 200 to prepare an infusion beverage can comprise several steps, as will be described herewith in what follows.

First, the pack 100 is introduced in the machine 200 in an essentially vertical way, in such a manner that the fitment assembly 10 is arranged at the bottom side of the pack 100. Either once the pack has been introduced or once the preparation and dispensing step starts, the machine 200 will cut or tear off the plug 14 from the outlet duct 12 in order to leave open the opening of the outlet duct 121. Then, the injecting means 230 from the machine 200 will pierce the lid or membrane arranged over the inlet chamber 120. As already explained, any of the two sides of the membrane over the inlet chamber 120 will be pierced, depending on the sense in which the pack 100 has been introduced in the machine 200.

Also, the data reader of the machine 200 will read the identification means 60 in one of the sides 27 or 27' of the container 20, depending on the sense in which it has been introduced. The data reader will then retrieve the information regarding the temperature, the total volume and the flow rate of the fluid, typically water, to be introduced by the injecting means 230 into the inlet chamber 120.

Once the membrane is pierced, the injecting means 230 will inject preferably water, inside the inlet chamber 120, at a pressure below 1 bar, most preferably at around 0.5 bar. The rest of parameters of this injection (temperature, volume and flow rate, referred to before as process parameters) will have been provided by the data reader when reading the identification means 60. The water injected will then be conveyed from the inlet chamber 120 through the inlet notches 110, 110' into the primary chamber 21. The water will then flow upwardly into the inner volume of the primary chamber 21 and will infuse with the beverage medium comprised in it. It will later pass through the primary part 30a of the filtering element 30, so the infused fluid will be filtered such that the beverage medium will remain in the primary chamber 21 and the infused fluid will flow into the secondary chamber 22.

Once in the secondary chamber 22, the water will then flow by gravity and will pass through the secondary part 30b of the filtering element 30 so that the infused fluid will be further filtered. Further, the fluid will flow downwards by gravity in the secondary chamber and will be conveyed to the entrance of the outlet duct from where it will flow out of the pack 100 and into a dedicated drinking cup 9, for example.

It is important to remark that the design of the fitment assembly 10 together with the flexible sheets 25 and 26 which are bonded (welded or thermo sealed, typically) to it define paths for the fluid to flow inside the pack 100 in such a way that the fluid is forced to follow these paths and cannot go through any others. In fact, the sheets 25, 26 are bonded to the fitment assembly 10 in a tight way, therefore tight paths are configured.

At the end of the process, the squeezing means of the machine 200 will squeeze the container 20 with the aim of evacuating any remaining liquid inside the container 20, in order to avoid any dripping, and also with the aim of reducing the final volume of the container 20, making it more compact, so that its removal is easier.

Particularly, these sealed or tight paths are the following:
  once the fluid is injected into the inlet chamber 120, the only path to follow is that formed by the inlet notches 110 and 110' in the inlet chamber 120 together with the flexible sheets 25 and 26, so the fluid is forced to pass through these inlet notches 110, 110' and flow into the primary chamber 21;
  inside the primary chamber 21, the fluid can only be conveyed upwards and towards the primary part 30a of the filtering element 30, through the lateral side of the container 27 and the compartmental channel 250;
  inside the secondary chamber 22, the fluid can only flow downwards by gravity through the secondary part 30b of the filtering element 30 and between the compartmental channel 250 and the lateral side of the container, entering the outlet duct 12 in the fitment assembly from where the fluid (already infused and filtered) is finally dispensed by gravity into a drinking cup 9 or the like.

Some of the advantages of the disposable pack of the invention and of the machine processing these packs will be described in what follows.

The pack of the invention is configured in a reversible way, so it can be operated in the machine in any sense in which it has been introduced, which presents a primary advantage for the consumer, who does not need to check or introduce the pack in a specific way. Therefore, it is one aim of the invention to propose a consumer friendly preparation of infusion beverage, where the beverage from the pack is ready to be served and does not require any additional processing. Moreover, best in-cup results are achieved as the extraction and processing is pre-defined and in fact comprised in the information on the identification means.

Another advantage comes from the manufacturing of the packs of the invention: as the fitment assembly has the same outer shape on both of its sides, when the flexible sheets are laid over at least part of this fitment assembly, there is no risk of crippling.

Also, in the pack of the invention the ingredients are fully protected from atmosphere before use. Besides, these packs present a low environmental impact since they can be made of a laminated pouch with a small insert piece (fitment assembly) of plastic.

The space needed for storing the packs according to the invention, the space needs the consumer has to preview for the packs is clearly much less than that for typical capsule containers, for example.

Other advantages of the invention come from the machine: the machine elements remain very simple and limited to a simple fluid needle, typically a simple water needle, piercing the pack and injecting the fluid, typically water, into the pack, to prepare the infusion beverage. Also, the data reader needed to read and retrieve information from the identification means is a simple device.

Also, another important advantage of the invention is to propose packs where the contact of ingredients and infusion beverage with the machine is avoided and the risk of cross contamination is therefore limited. The prepared beverages present optimal organoleptic properties.

Another main advantage for the consumer, provided by the invention is that the injecting means, typically a needle, do not touch the product at all, so any type of contamination is avoided.

Besides, some other advantages of the pack of the invention are indicated herewith:
the pack is flexible and adaptable, thus easy to handle
the weight of the pack is low and remains minimised
the infusion parameters come with the pack and the recipe is therefore optimised
the pack is disposable so requires no cleaning of the machine and is extremely practical to use
the machine operates the pack under direct flow, so there is no fluid which flows inside any part of the machine, avoiding any cleaning needs or any possible contamination in the machine
the process of preparing the infusion beverage is continuous, which therefore minimises the time needed;
the infusion beverage extracted directly flows into the cup or recipient, so the process is simple and easy for the consumer.

Although the present invention has been described with reference to preferred embodiments thereof, many modifications and alternations may be made by a person having ordinary skill in the art without departing from the scope of this invention which is defined by the appended claims.

LIST OF REFERENCES

100 Pack
30 Filtering element
30a Primary part of filtering element
30b Secondary part of filtering element
60 Identification means
61 Punched holes
250 Compartmental channel
21 Primary chamber
22 Secondary chamber
10 Fitment assembly
120 Inlet chamber
110 Inlet notch
110' Inlet notch
13 Ribs
14 Plug
15 Bond
16 Weakened area
12 Outlet duct
17 Sealing wall
121 Opening of outlet duct
20 Container
27 Lateral side of container
27' Lateral side of container
28 Upper side of container
29 Lower side of container
25 Flexible sheet of container
26 Flexible sheet of container
210 Excrescence
200 Machine
201 Receiving means
84 Fluid tank
82 Pump
83 Heater
87 By-pass line
85 Cutting device
86 Positioning area
9 Drinking cup
230 Injecting means

The invention claimed is:

1. A pack having an inner volume in which a beverage medium is stored and from which an infusion beverage is prepared when a fluid is introduced inside the pack, the inner volume is defined by sheets of material joined to one another at their edges, such that the inner volume presents a generally plane shape,
the pack comprising an inlet chamber configured to accommodate an inflow of the fluid that will infuse the beverage medium to produce the infusion beverage and at least one outlet duct for delivering the infusion beverage from the inner volume, the inlet chamber and the at least one outlet duct are positioned at a bottom of the pack, and
the pack further comprising a compartmental channel and a filtering element together defining a dedicated chamber inside the inner volume of the pack where the beverage medium is confined, the filtering element is configured for preventing particles of the beverage medium from entering the at least one outlet duct when the fluid is introduced in the pack and the infusion beverage is prepared, thus preventing the particles from being delivered together with the infusion beverage,
wherein the inlet chamber is reversibly configured in the pack such that a first piercable lid is laid over one side of the inlet chamber and a second piercable lid is laid over a reverse side of the inlet chamber.

2. The pack according to claim 1, wherein the inner volume defined by the sheets of material defines a plane essentially vertically oriented during beverage production, the inlet chamber being oriented essentially perpendicularly to the plane defined by the inner volume, the at least one outlet duct being arranged essentially vertically from the inner volume enabling a free flow of the infusion beverage prepared from the pack.

3. The pack according to claim 1, wherein the inlet chamber and the at least one outlet duct are comprised in a fitment assembly, the fitment assembly is arranged at the bottom of the pack and is at least partially positioned between two joined edges of the sheets of material.

4. The pack according to claim 3, wherein the fitment assembly is made of a rigid plastic material.

5. The pack according to claim 1, wherein the inner volume of the pack is defined by two flexible sheets of material bonded together at least on their lateral sides, the two flexible sheets also conforming at least one piercable lid over the inlet chamber.

6. The pack according to claim 1, wherein the inner volume of the pack is defined by one single flexible sheet folded in half into two parts joined at edges of the one single flexible sheet.

7. The pack according to claim 1, wherein the sheets of material configuring the inner volume of the pack are water impermeable, are bonded together by thermo sealing and are made of a material selected from the group consisting of: plastic laminates, metallised foil, alufoil and fiber base material.

8. The pack according to claim 1, wherein the filtering element is arranged transversely in the inner volume of the pack and fixed to lateral edges of the sheets of material configuring the inner volume.

9. The pack according to claim 1, further comprising an identification member comprising information on one or more process parameters to prepare the infusion beverage, as a function of the beverage medium, the one or more process parameters being selected from the group consisting of: temperature of the fluid accommodated into the inlet chamber, total volume of fluid, and fluid flow accommodated inside the inlet chamber.

10. The pack according to claim 9, wherein two sets of symmetrically arranged identification members are arranged in the pack, so that the one or more process parameters in the identification member can be reversibly read.

11. The pack according to claim 9, wherein the identification member comprises a recognition member that is selected from the group consisting of: mechanical codes, optical codes, RFID tags, bar codes, magnetic codes, embossing codes and LED.

12. A pack having an inner volume in which a beverage medium is stored and from which an infusion beverage is prepared when a fluid is introduced inside the pack, the inner volume is defined by sheets of material joined to one another at their edges, such that the inner volume presents a generally plane shape,
the pack comprising an inlet chamber configured to accommodate an inflow of the fluid that will infuse the beverage medium to produce the infusion beverage and at least one outlet duct for delivering the infusion beverage from the inner volume, the inlet chamber and the at least one outlet duct are positioned at a bottom of the pack, and
the pack further comprising a compartmental channel and a filtering element together defining a dedicated chamber inside the inner volume of the pack where the beverage medium is confined, the filtering element is configured for preventing particles of the beverage medium from entering the at least one outlet duct when the fluid is introduced in the pack and the infusion beverage is prepared, thus preventing the particles from being delivered together with the infusion beverage,
wherein the inlet chamber and the at least one outlet duct are comprised in a fitment assembly, the fitment assembly being arranged at the bottom of the pack and being at least partially positioned between two joined edges of the sheets of material, wherein the fitment assembly further comprises two symmetrically arranged inlet notches allowing the fluid to flow out of the inner volume of the inlet chamber.

13. A pack having an inner volume in which a beverage medium is stored and from which an infusion beverage is prepared when a fluid is introduced inside the pack, the inner volume is defined by sheets of material joined to one another at their edges, such that the inner volume presents a generally plane shape,
the pack comprising an inlet chamber configured to accommodate an inflow of the fluid that will infuse the beverage medium to produce the infusion beverage and at least one outlet duct for delivering the infusion beverage from the inner volume, the inlet chamber and the at least one outlet duct are positioned at a bottom of the pack, and
the pack further comprising a compartmental channel and a filtering element together defining a dedicated chamber inside the inner volume of the pack where the beverage medium is confined, the filtering element is configured for preventing particles of the beverage medium from entering the at least one outlet duct when the fluid is introduced in the pack and the infusion beverage is prepared, thus preventing the particles from being delivered together with the infusion beverage, wherein the at least one outlet duct is closed by a plug, the plug is attached to the fitment assembly on another side of the fitment assembly, the at least one outlet duct further comprising a weakened area near the plug allowing the separation of the plug from the at least one outlet duct.

14. A pack having an inner volume in which a beverage medium is stored and from which an infusion beverage is prepared when a fluid is introduced inside the pack, the inner volume is defined by sheets of material joined to one another at their edges, such that the inner volume presents a generally plane shape,
the pack comprising an inlet chamber configured to accommodate an inflow of the fluid that will infuse the beverage medium to produce the infusion beverage and at least one outlet duct for delivering the infusion beverage from the inner volume, the inlet chamber and the at least one outlet duct are positioned at a bottom of the pack, and
the pack further comprising a compartmental channel and a filtering element together defining a dedicated chamber inside the inner volume of the pack where the beverage medium is confined, the filtering element is configured for preventing particles of the beverage medium from entering the at least one outlet duct when the fluid is introduced in the pack and the infusion beverage is prepared, thus preventing the particles from being delivered together with the infusion beverage,
wherein the filtering element is arranged transversely in the inner volume of the pack and fixed to lateral edges of the sheets of material configuring the inner volume, wherein the filtering element comprises a primary part for a primary filtering of the infused beverage separating the fluid from the beverage medium and a secondary part for a further filtering of the infused beverage.

15. A machine for preparing an infusion beverage from a pack having an inner volume in which a beverage medium is stored and from which an infusion beverage is prepared when a fluid is introduced inside the pack, the inner volume being defined by sheets of material joined to one another at their edges, such that the inner volume presents a generally plane shape, the pack comprising an inlet chamber configured to accommodate an inflow of the fluid that will infuse the beverage medium to produce the infusion beverage and at least one outlet duct for delivering the infusion beverage from the inner volume, the inlet chamber and the at least one outlet duct being positioned at a bottom of the pack, and the pack further comprising a compartmental channel and a filtering element together defining a dedicated chamber inside the inner volume of the pack where the beverage medium is confined, the filtering element is configured for preventing particles of the beverage medium from entering the at least one outlet duct when the fluid is introduced in the pack and the infusion beverage is prepared, thus preventing the particles from being delivered together with the infusion beverage, the machine comprising a receiver adapted to accommodate the pack, the machine further comprising an injector configured for accommodating the fluid inside an inner volume of the inlet chamber, and the machine further comprising a cutting device for cutting a plug from the at least one outlet duct.

16. The machine according to claim 15, wherein the injector comprises a fluid needle configured for accommodating the fluid inside the inner volume of the inlet chamber at a pressure below around 1 bar.

17. The machine according to claim 15, further comprising a data reader configured to read and retrieve information of at least one process parameters from an identification means in the pack.

18. The machine according to claim 17, wherein the data reader comprises a light emitter device.

* * * * *